US006938650B2

(12) United States Patent
Mitchell

(10) Patent No.: US 6,938,650 B2
(45) Date of Patent: Sep. 6, 2005

(54) FILLING APPARATUS

(75) Inventor: David Mitchell, Darra (AU)

(73) Assignee: Private Brand Tools (Australia) PTY LTD, Queensland (AU)

( * ) Notice: Subject to any disclaimer, the term of this patent is extended or adjusted under 35 U.S.C. 154(b) by 0 days.

(21) Appl. No.: 10/721,085

(22) Filed: Nov. 26, 2003

(65) Prior Publication Data

US 2005/0109421 A1 May 26, 2005

(51) Int. Cl.[7] ............................................ B65B 31/00
(52) U.S. Cl. ........................ 141/59; 141/285; 141/302; 141/309; 141/375; 222/479; 222/484
(58) Field of Search .......................... 141/59, 285, 290, 141/301, 302, 305, 308, 309, 375, 364, 363, 141/366, 380, 381; 222/479, 484

(56) References Cited

U.S. PATENT DOCUMENTS 243,148 A * 6/1881 Matthews .................... 141/54
569,180 A * 10/1896 Donally ...................... 141/302
2,463,922 A * 3/1949 Turner ........................ 141/288
2,615,607 A * 10/1952 Huskey ...................... 141/305
3,181,576 A * 5/1965 Pellerino et al. ............ 141/293
3,263,711 A * 8/1966 Laub ........................... 141/40
3,606,096 A * 9/1971 Campbell ................... 222/479
4,068,687 A * 1/1978 Long ........................... 141/59
4,176,694 A * 12/1979 Dickerson .................... 141/95
4,946,079 A * 8/1990 Campbell ................... 222/484

OTHER PUBLICATIONS www.vacula.com, Brake Service Hyperlink.

* cited by examiner

*Primary Examiner*—Khoa D. Huynh
(74) *Attorney, Agent, or Firm*—Nixon & Vanderhye, P.C.

(57) ABSTRACT

A filling apparatus for attachment to a neck of a fluid reservoir is disclosed. The apparatus has a container for fluid and a stem projecting from the container. Two passages extend through the stem. One of the these passages allows fluid from the container to flow into the reservoir and the other passage allows air to flow into the container to prevent the formation of a partial vacuum in the container. The apparatus includes a tap movable between an ON and an OFF position to allow and prevent the flow of fluid through the passages. The apparatus has a mount for releasably securing the apparatus to the fluid reservoir.

15 Claims, 5 Drawing Sheets

FILLING APPARATUS

BACKGROUND OF THE INVENTION

This invention relates to a filling apparatus. In particular, the invention relates to a filling apparatus for filling a brake fluid reservoir during bleeding of vehicle brake lines.

The invention will be described by way of example with reference to the use of the apparatus with vehicle brake line bleeding. This description is given by way of example and the apparatus may also be used for other purposes.

The bleeding of brake lines to remove air in the lines requires an end of the line adjacent the brake pads/linings to be opened to drain a small quantity of fluid from the line to displace any air remaining in the line. As a consequence, the level of fluid in a brake fluid reservoir drops and the reservoir must be replenished to maintain proper fluid levels. There is a danger during the bleeding operation for the reservoir to be emptied and air rather than brake fluid is then introduced into the brake lines. This requires the bleeding operation to be recommenced after the reservoir has been refilled.

To guard against emptying the reservoir during a brake line bleeding operation, the reservoir level needs to be periodically checked and replenished. This can be tedious particularly if the vehicle is on a hoist and raised off the ground.

An apparatus for automatically replenishing the brake fluid reservoir during brake line bleeding is known. That apparatus had a container for brake fluid and a stem projects from the container. The stem had a single passage through it and a tap was located along the stem and was operable to allow the flow of brake fluid through the stem or to prevent this flow.

This apparatus had a mounting plate with a collar through which the stem projected. A set screw was screw threaded relative to the collar and adjustment of the extent to which the stem projected into the reservoir was a two handed operation. The container needed to be held, the set screw operated, the stem shifted to the desired position and the set screw was then tightened while the container was held to lock the stem relative to the collar.

The stem had a passage through which the fluid from the container would flow to fill the reservoir. This passage to a degree allowed air to enter the container. However, there was a tendency for a partial vacuum to form in the container and this often resulted in prevention of flow of fluid from the container. Flow of fluid through this passage was not smooth.

A screw threaded driven clamp was used to lock the apparatus to the neck of the brake fluid reservoir. This did not provide a quick and effective means for securing the apparatus to the brake fluid reservoir.

OBJECT OF THE INVENTION

It is an object of the invention to at least minimise some of the disadvantages mentioned above.

SUMMARY OF THE INVENTION

According to one aspect, the invention provides a filling apparatus attachable to a neck of a fluid reservoir, the apparatus having a container for fluid, a stem extending from the container, a first passage extending through the stem for allowing fluid to flow from the container to the reservoir, a second passage extending through the stem for allowing air to be introduced into the container to prevent the formation of a partial vacuum in the container when fluid is allowed to flow from the container, a tap movable between an ON and an OFF position to allow and prevent fluid and air from flowing through the passages, respectively, and a mount adapted to releasably secure the apparatus to the fluid reservoir.

Preferably, the mount is adjustable in its position along the stem. In one embodiment, the stem may have a screw threaded portion extending for a distance along its length. The mount may have a screw threaded aperture for engagement with the screw threaded portion of the stem. Preferably, the mount has a collar secured to it and the collar has a screw threaded aperture for engaging with the screw threaded portion of the stem.

The mount may have an abutment extending from it for engagement with the inside of the neck of the reservoir. The mount may have a spring biased lever adapted to engage the outside of the neck of the reservoir to allow the neck to be clamped between the lever and the abutment. The lever has an operating end and a free end for engagement with the neck. Preferably the free end is tapered.

The second passage through the stem may have a tube fitted to it to form an extension to the passage. The tube has an end that terminates adjacent to and short of a base of the container.

Preferably the tap simultaneously allows or prevents the flow of fluid in both passages.

DESCRIPTION OF THE DRAWINGS

A preferred embodiment of the invention will now be described by way of example with reference to the drawings in which.

DETAILED DESCRIPTION OF THE PREFERRED EMBODIMENT

Figure 1:
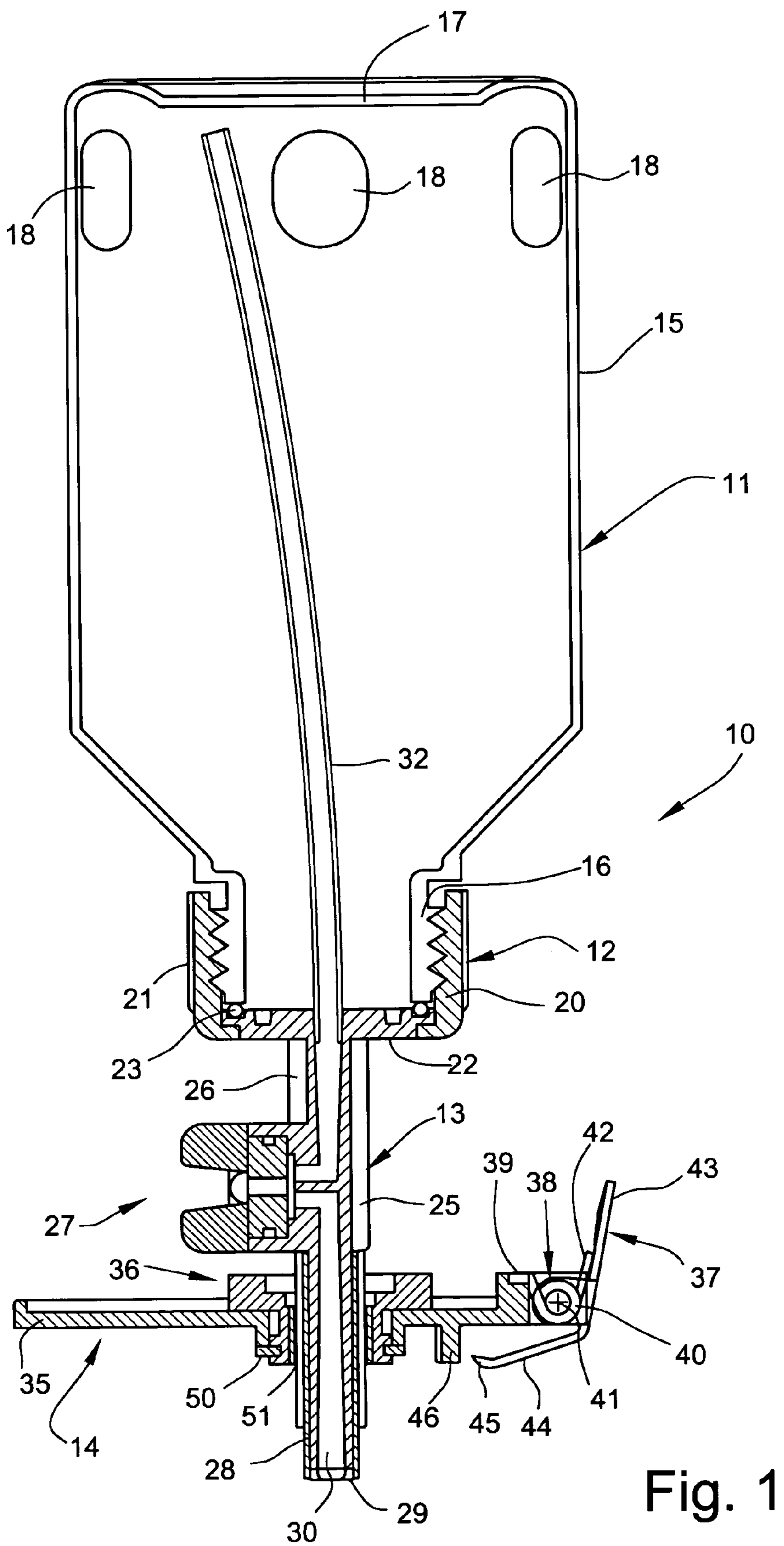
FIG. 1 is a partial sectional view of a filling apparatus of the invention.

The filling apparatus 10 shown in FIG. 1 has a container 11, a cap 12, a stem 13 and a mount 14.

The container 11 has a body 15, a neck 16 and a base 17. The neck 16 has a threaded finish for receiving the cap 12. The body 15 of the container 11 has dimples 18 located at spaced locations around it near the base 17. As shown in the figure, the base 17 has a slightly recessed configuration.

The cap 12 has a skirt 20 with spaced ribs 21 extending around and along it and the inside of the skirt is threaded for engagement with the neck 16 of the container.

A wall 22 extends across the cap and an inner surface of the wall 22 carries a sealing ring 23 which seals against an end of the neck 16. The wall 22 is formed as a separate component to the skirt 20 and has a stepped periphery received by an aperture in the skirt.

Stem 13 is formed integrally with the wall 22. The stem 13 has longitudinally extending diametrically opposed flanges 25 and 26. An ON/OFF tap 27 is present along the length of the stem 13. The stem has a distal externally thread portion 28 and a free end 29. Two passages extend through the stem and in FIG. 1 only passage 30 is visible. The other passage 31 is visible in FIG. 3. Tube 32 forms an extension to the passage 30 and terminates adjacent to and short of the base 17.

Mount 14 has a rectangular portion 35, a collar 36 and a spring biased locking lever 37. The biasing spring 38 has a free end 39 which engages an upper portion of the portion 35, a coil 40 which locates about a pin 41 and a free end 42 which engages against portion 43 of the lever 37. Portion 44 of the lever 37 has a tapered end 45. A downwardly extending abutment 46 projects from a lower portion of the rectangular portion 35.

Collar 36 is secured to rectangular portion by a circular clip 50 and has an aperture with a threaded portion 51 for engagement relative to thread portion 28 on the stem 13. The mount 14 may be rotated relative to the stem to allow its position along the threaded portion 28 to be adjusted.

Figure 2:
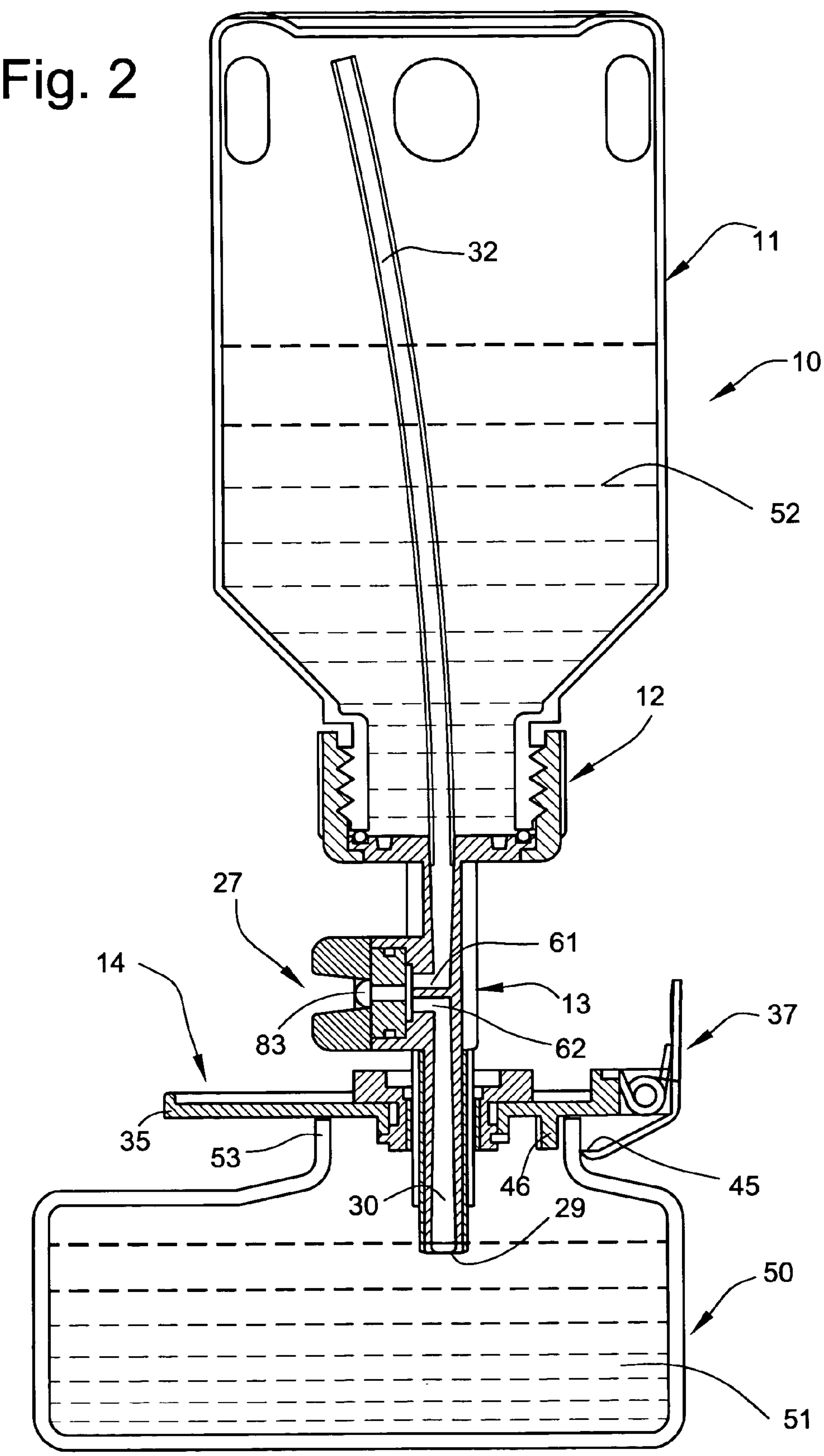
FIG. 2 is a partial sectional view of the apparatus of FIG. 1 shown mounted to a brake fluid reservoir.

FIG. 2 shows the apparatus 10 mounted relative to a brake fluid reservoir 50. Rectangular portion 35 is positioned to extend across the open top of the reservoir 50 with the abutment 46 being located against the inside of the neck 53 of the reservoir 50. The position of portion 35 along the length of the stem 13 is adjusted so that end 29 is at the desired level within the reservoir. When brake fluid 51 within the reservoir is removed during a brake line bleeding operation, fluid 52 within the container 11 automatically replenishes the reservoir 50 with fluid up to a level dictated by the location of end 29 within the reservoir 50.

Spring 38 biases the tapered end 45 of the lever against the neck 53 of the reservoir 50 and the neck 53 is clamped securely between end 45 and abutment 46.

Figure 3:
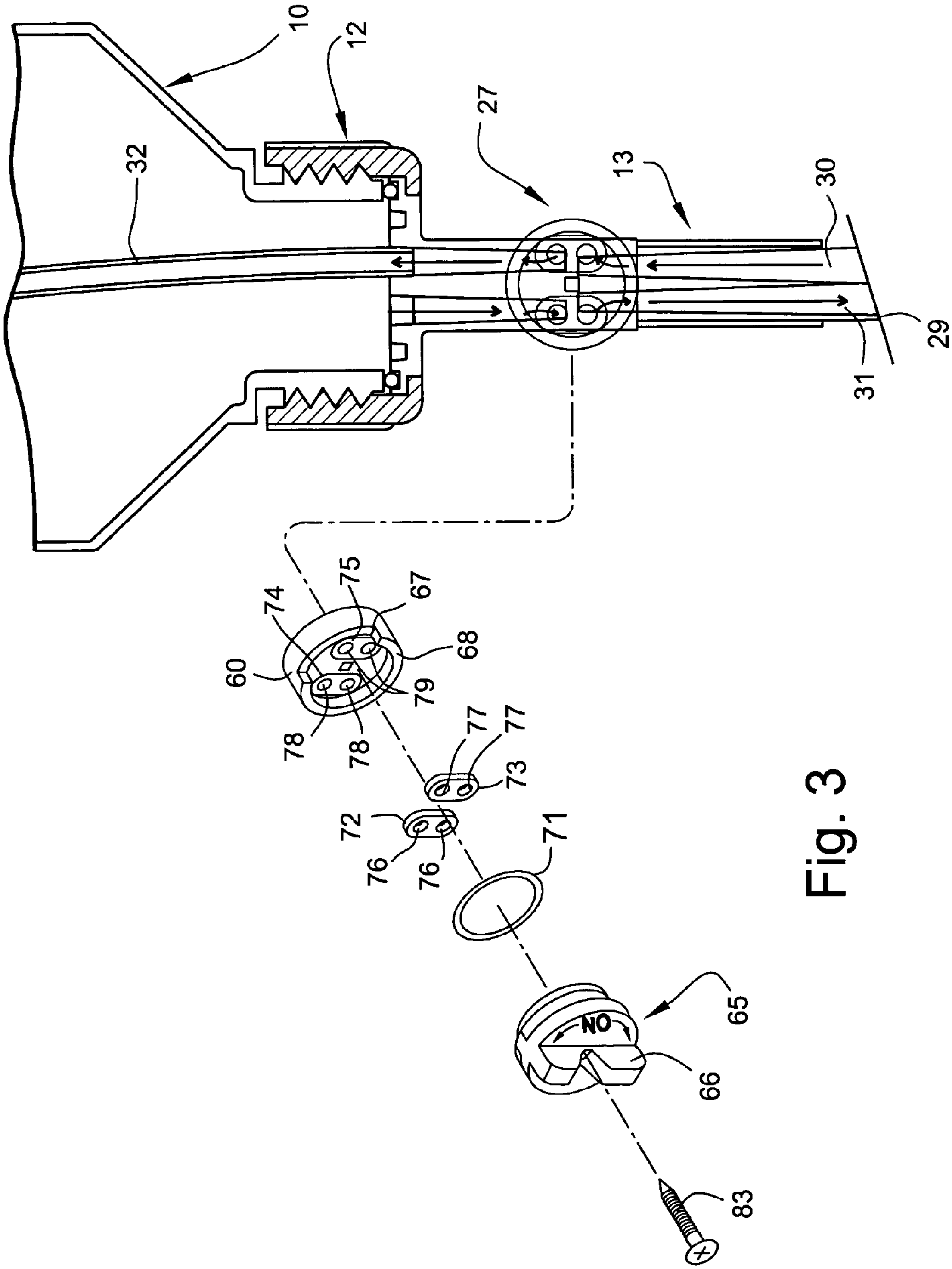
FIG. 3 is a partial exploded view of the apparatus of FIG. 1.

FIG. 3 shows an exploded view of the ON/OFF tap 27. The tap 27 has a housing 60 formed integrally with the stem 13. Passages 30, 31 extend through the stem 13 and tube 32 forms an extension to passage 30. In FIG. 2 detail of passage 30 in the vicinity of the tap 27 is shown. The passage 30 has L shaped regions 61, 62 (see FIG. 2). Passage 31 is similarly configured.

The tap 27 has a housing 60 and an operator 65 which is received by the housing 60. The operator 65 has a flange 66 which may be grasped by a user to rotate the operator 65 relative to the housing 60. The rotation of the operator 65 relative to the housing 60 is limited by the extent of a recess 67 formed in skirt 68 of the housing 60 and by a stop 69 (see FIG. 4) formed on the operator. The operator 65 has a groove 70 for receiving seal 71. Inserts 72, 73 are received within cavities 74, 75 in the housing. Apertures 76 in insert 72 align with bores 78 in the housing. Apertures 77 in insert 73 align with bores 79 in the housing. Bores 79 communicate with portions 61, 62 of the passage 30.

Figure 4:
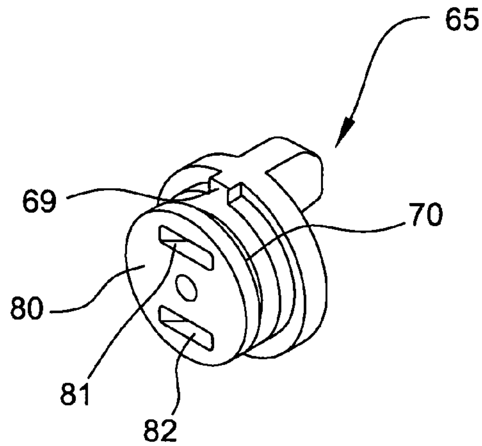
FIG. 4 is a perspective view of part of an ON/OFF tap of the apparatus.

As shown in FIG. 4, the inner face 80 of the operator 65 has two elongate cavities 81, 82. Operator 65 is fixed to the housing 60 by a screw 83.

Figure 5A:
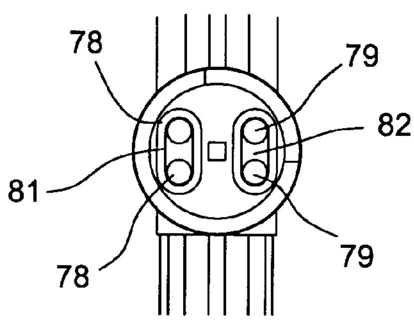
FIG. 5A shows a view of the ON/OFF tap in its "ON" position.
Figure 5B:
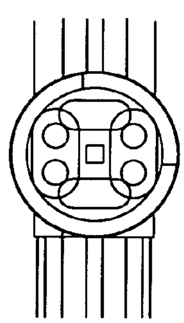
FIG. 5B shows a view of the tap in its "OFF" position.

When cavity 81 is in alignment with apertures 76 and bores 78 fluid may flow through the passage 31. This alignment is shown in FIG. 5A which shows the tap 27 in its "ON" position. When cavity 82 is in alignment with apertures 77 and bores 79 fluid may flow through passage 30. This alignment is shown in FIG. 5A which shows the tap in its "ON" position. When the tap 27 is in its "ON" position fluid may flow through both passages 30, 31. When the cavities 81, 82 are out of the alignment described the tap 27 is in its "OFF" position and fluid is no longer able to flow through passages 30, 31. This misaligned position results through rotation of the operator 65 and this misalignment is shown in FIG. 5B.

Figure 6:
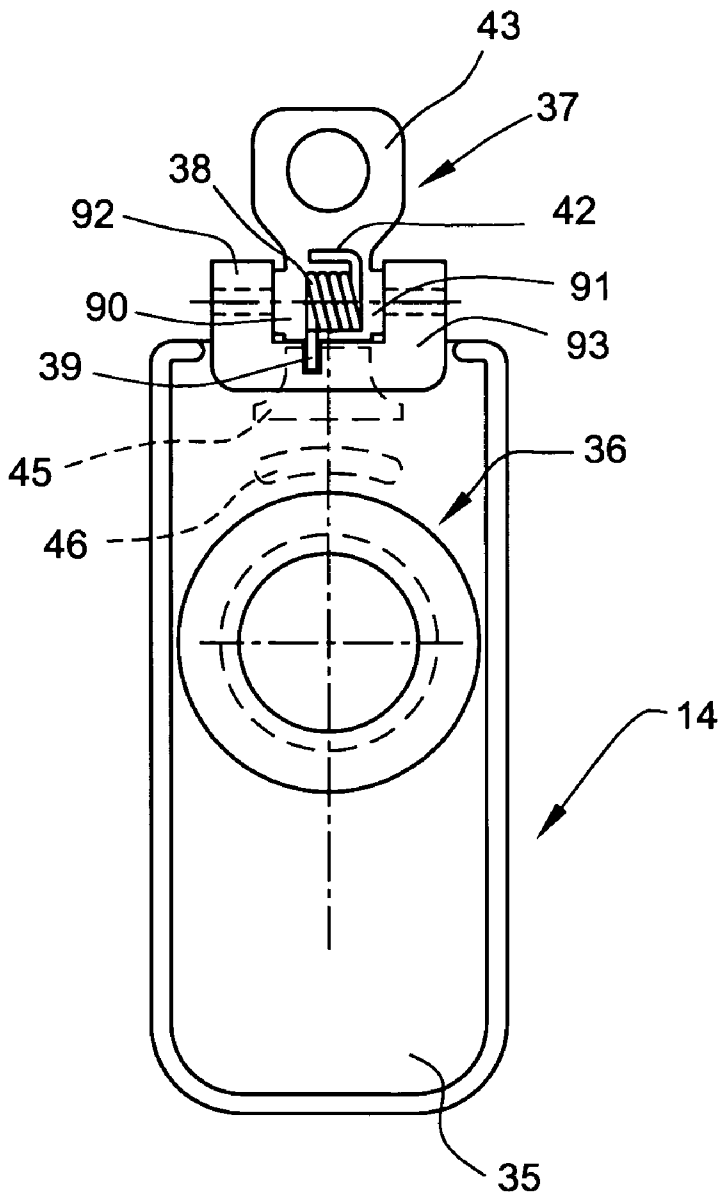
FIG. 6 shows a plan view of the mount.

FIG. 6 shows a plan view of the mount 14. The mount 14 has a rectangular portion 35 which has a width less than the diameter of the neck of the reservoir 50. The abutment 46 which extends from the rectangular portion 35 has an arcuate shape to follow the contour of the inside of the neck of the reservoir 50. End 43 of the lever 37 is enlarged as shown. The lever has flanges 90, 91 through which pin 41 (see FIG. 1) may pass. Ends of the pin 41 are received in the adjacent portions 92, 93 of the mount 14.

In use, the cap 12 is removed from the body 15 of the container 11 and is filled with fluid 52. The cap 12 is screwed onto the neck 16 of the container.

The tap 27 is moved to its "OFF" position (FIG. 5B) and the container 11 is inverted as shown in FIG. 1.

A closure is removed from fluid reservoir 50 and the mount 14 is clamped to the neck 53 of the reservoir 50 in a one handed operation. The container 11 is rotated to cause the stem 13 to rotate relative to the mount 14 to position end 29 at the required level within the reservoir 50.

The tap 27 is moved to its open position. This allows fluid to flow from the container 11, through passage 31 and into the reservoir. The tube 32 and passage 30 allows air to enter the container 11 to prevent the formation of a partial vacuum in the container 11. The formation of a partial vacuum has the tendency to form a vacuum lock which inhibits or prevents fluid from flowing from the container 11. When the reservoir 50 is filled up to a level dictated by end 29 of the stem 13, ends of the passages 30, 31 are immersed in fluid 51 at which time no further fluid 52 is able to flow through passage 31 and no air is able to flow through passage 30. The brake bleeding operation may then commence. As fluid 51 is drained from the reservoir 50 more fluid 52 is able to flow into the reservoir and air may flow into the container to prevent formation of a partial vacuum in the container 11. Once the bleeding operation is complete tap 27 is turned to its "OFF" position and the apparatus is unclamped from the neck 53 of the reservoir 50. This is a one handed operation.

The spring based clamping action securely locks the apparatus relative to the neck of the reservoir. The adjustment of the position of end 29 within the reservoir to control the level of fluid within the reservoir is a one handed operation and simply requires rotation of the stem 13 relative to the mount 14.

The venting of the container 11 to prevent formation of a partial vacuum within the container 11 allows the passages 30, 31 to be of a relatively small transverse area and results in a more compact apparatus.

End 29 may terminate at an angle as shown in FIG. 3. This places the opening of the passage 30 above the opening in passage 31 relative to the level of fluid 51 in the reservoir. This ensures that the container 11 is always vented. However, such a configuration is not essential and the openings in the passages may be at the same height and the stem may have a square rather than an inclined end.

I claim:

1. A filling apparatus attachable to a neck of a fluid reservoir, the apparatus having a container for fluid, a stem extending directly from the container, a first passage extending through and along the stem for allowing fluid to flow from the container to the reservoir, a second passage extending through and along the stem for allowing air to be introduced into the container to prevent the formation of a partial vacuum in the container when fluid is allowed to flow from the container, a tap on the stem operable between an ON and an OFF position to simultaneously either open or close both of the passages and a mount having a locking lever with a biasing spring attached to the mount adapted to releasably secure the apparatus to the neck of the fluid reservoir.

2. The apparatus of claim 1 including a tube forming an extension to the second passage, the tube terminating adjacent to and short of a base of the container.

3. The apparatus of claim 1 wherein the container has a screw threaded neck and the apparatus includes a cap with a screw threaded skirt for engagement with the neck of the container and a wall received within an aperture in the skirt.

4. The apparatus of claim 3 wherein the stem is formed integrally with and projects from the wall.

5. The apparatus of claim 4 wherein the passages are parallel to one another.

6. The apparatus of claim 4 wherein a free end of the stem terminates at an inclined angle.

7. The apparatus of claim 1 wherein the stem is screw threaded along a portion of its length.

8. The apparatus of claim 7 wherein the mount has a rectangular portion adapted for screw threaded engagement with the stem.

9. The apparatus of claim 8 wherein the rectangular portion has an aperture and a screw threaded collar is received within the aperture for engagement with the screw threaded portion of the stem.

10. The apparatus of claim 8 including an abutment projecting from the rectangular portion of the mount.

11. The apparatus of claim 10 wherein the locking lever secured to the rectangular portion of the mount and adjacent the abutment whereby the neck of the fluid reservoir may be clamped between the abutment and an end of the lever.

12. The apparatus of claim 11 wherein the end of the lever is tapered.

13. The apparatus of claim 1 wherein the tap includes a housing and an operator secured to the housing.

14. The apparatus of claim 13 wherein the housing is formed integrally with the stem.

15. The apparatus of claim 13 wherein the operator has an inner face with two cavities which, in the ON position of the tap allow fluid to flow through the passages.

* * * * *